UNITED STATES PATENT OFFICE.

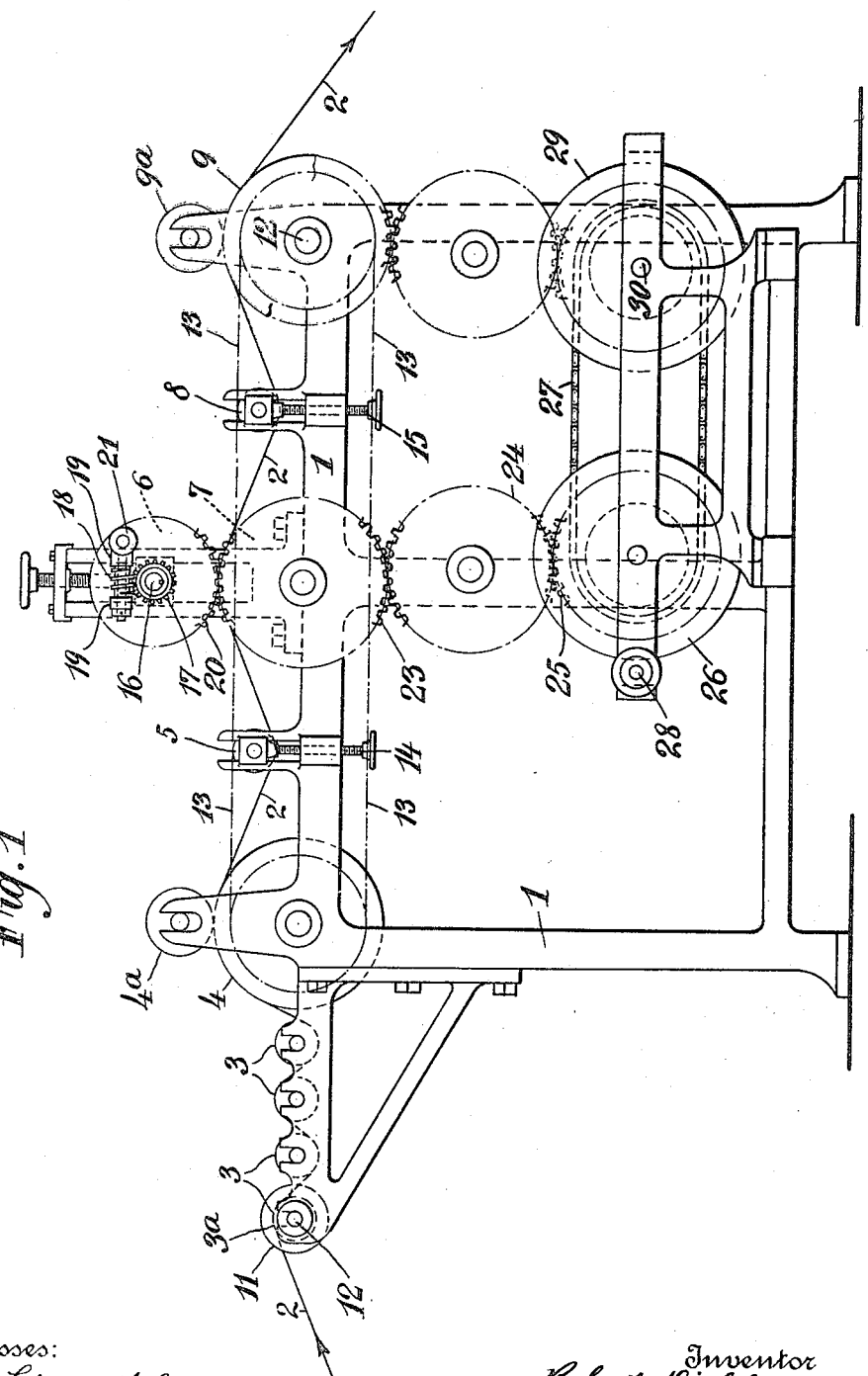

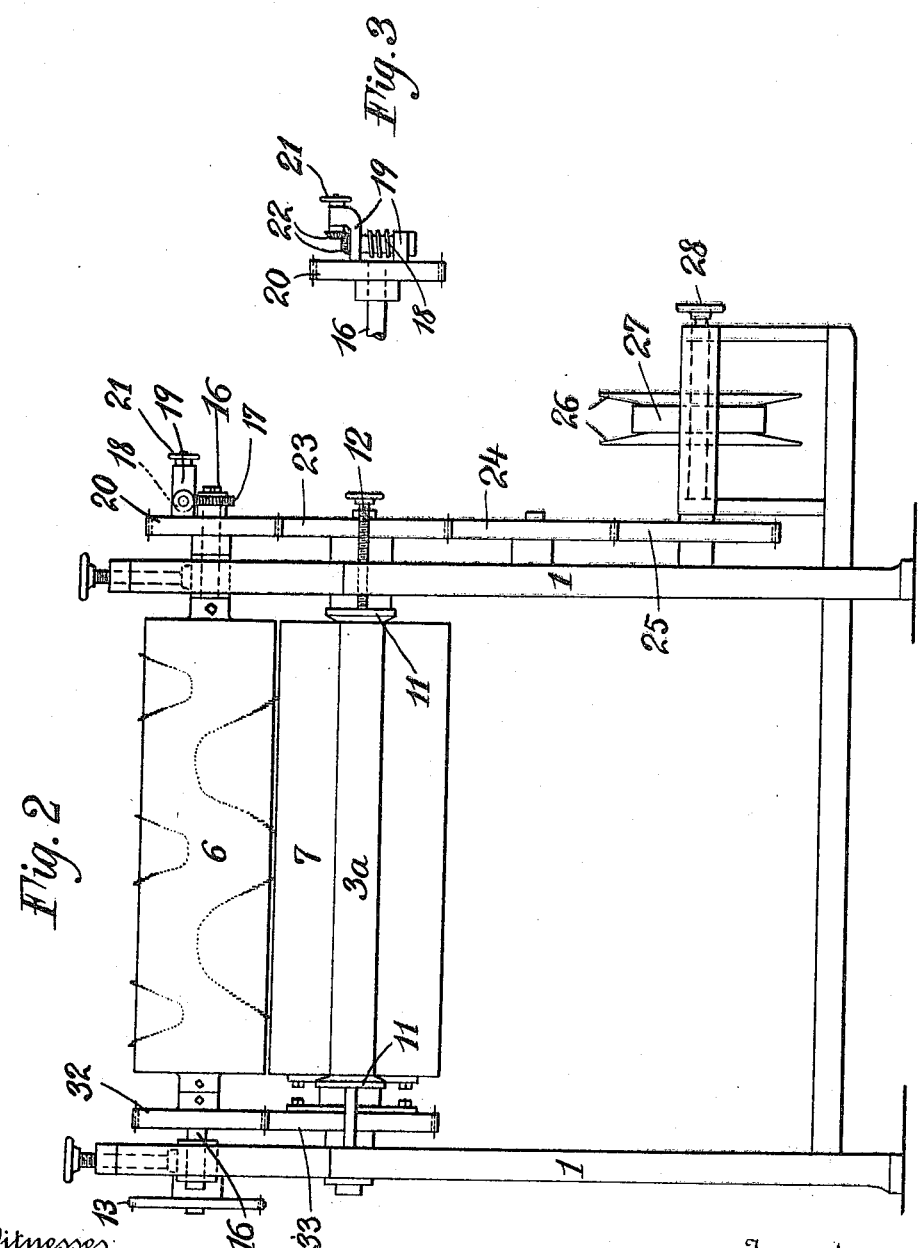

ROBERT DIEHL, OF PHILADELPHIA, PENNSYLVANIA, ASSIGNOR TO WILLIAM F. MARRESFORD, OF BROOKLYN, NEW YORK.

MACHINE FOR MAKING CUT-OUT WALL-PAPER.

1,223,942.  Specification of Letters Patent.  Patented Apr. 24, 1917.

Application filed April 7, 1914. Serial No. 830,103.

*To all whom it may concern:*

Be it known that I, ROBERT DIEHL, a citizen of the United States, residing at Philadelphia, in the county of Philadelphia and State of Pennsylvania, have invented certain new and useful Improvements in Machines for Making Cut-Out Wall-Paper, of which the following is a full, clear, and exact specification.

This invention relates to machines for the manufacture of cut-out wall paper, that is wall paper having an irregular cut edge outlining a pattern, and used for decorated borders and the like.

The object of the invention is to provide a rotary machine in which not only can the paper be continuously cut in long lengths, but it can be maintained in registry with the cutters both longitudinally and laterally. This is an essential in machines of this character, since it is found in actual practice that printed or coated webs of wall paper, or the like, do not run uniformly, owing to stretch, contraction or warping of the paper. Unless the cutters are positioned in proper registry with the variations in the pattern, the product is useless for any purpose, because the cut edges will not register with the printed design.

According to this invention, I have devised a rotary, design cutting machine embodying means for varying the cut length of the pattern, so that registry of the printed design with the cutters is maintained, notwithstanding variations in the length of the design as actually printed on the paper. Thereby, accurate machine cut decorated borders, or the like, may be rapidly produced in large quantity.

In the accompanying drawings,

Figure 1 is an elevation of a machine embodying the invention;

Fig. 2 is an elevation, and

Fig. 3 is a detail of the mechanism for adjusting the relation between the cutter and the paper.

1 represents a frame through which passes the web 2 and having at its near end a series of guide and tension rollers 3, the first one of which is flanged, thence the web passes between feed rollers 4 and 4ª under an adjustable tension roller 5, thence between a rotary cutting or perforating roller 6 and a platen roller 7, thence under another tension roller 8 similar to 5, and thence between feeding rollers 9 and 9ª, and out to a suitable winding up mechanism.

The first roller 3ª is provided with flanges 11, and is laterally adjustable in its bearings by screws 12, so as to properly shift the paper laterally in order to aline the paper thereon with the pattern on the cutting roller 6. The roller 4 is driven from the shaft 12 of feed roller 9 by a belt 13. The tension rollers 5 are adjustable vertically to maintain the alinement of the web between the feed rollers 4 and 4ª and 9 and 9ª by vertical set screws 14 and a similar set screw 15 is provided for the roller 8, as it is necessary to maintain proper tension on the web on each side of the cutting roller 6 and platen 7.

The cutting roller 6 is fixed on a shaft 16, which is in the frame adjustable to control the depth of the cut, and at one end carries keyed thereto a worm wheel 17. Meshing with the worm wheel 17 is a worm 18, which is carried by two lugs 19 fastened to the side of gear 20. When the worm 17 is turned as by hand wheel 21 through bevel gears 22, the gear 20 and platen 7 will be revolved relatively to worm wheel 17 of the shaft 16 and the cutting roller 6. Also, the platen 7 will be revolved relatively to the paper, through gears 32, 33. It will be seen that the platen is not driven by loose gear 23, but from the cutter shaft through gears 32, 33. It will be understood that the platen need not necessarily be shifted with the cutters, in order to vary the length of the cut pattern, but it is advantageous to do it, because it reduces the possibility of tearing the paper. Thereby, it is possible for the operator, while the machine is running to very minutely vary the longitudinal relation between the cutting edges of the cutting roller 6 and the paper and change the length of the cut pattern. The gear 20 is driven by loose gear 23 on the platen roller shaft which latter is driven by gear 24 and itself by gear 25. The gear 25 is driven by two cone pulleys 26, over which runs a belt 27, and by screw 28 it is possible to move these cone pulleys 26 toward or from each other simultaneously with similar cone pulleys 29 to vary the speed ratio transmitted by the belt 27. One of the shafts carrying the cone pulleys, as 30, will be connected to the source of power. This is a well known type of variable speed gear and need not be further described. By this form of driving mechanism, it will be seen that the speed of the paper as determined by the feed rollers 4 and 9 can be very accurately adjusted to the speed of the cutting roller as determined by the train of gears 25, 24, 23, 20. But in order to overcome the trouble due to the varying length of the pattern on the paper, or to creeping of the paper relatively to the cutter roller, so as to make the cutters always cut in proper relation to the pattern, it is desirable to permit the operator to adjust the gear 20 relatively to the cutting roller 6 so as to advance or retard the relative position of the cutter and the pattern the necessary amount. I have discovered that this can be readily done by the operator while the paper is running, the advance or retardation between the cutter and the paper at any point being so slight as not to damage the paper. Obviously it would not do to suddenly shift the cutting roller relatively to the paper, nor while the paper is at rest, but while the paper is running through the machine this small shifting sufficient to maintain the pattern and the cutters in registry can be easily effected without injury to the paper. Thus, the variable speed drive enables the approximate speed registry to be obtained and then the position adjustment by the shifting of the cutting roller relatively to the paper while traveling. The variable speed mechanism can also be manipulated to longitudinally register the cutters and the pattern while the machine is running, and vary the cut length of the pattern.

The cutters used on the roller 6 can make a continuous cut in the paper, or not as desired, as cutters of various forms are known in the art. Where I say cutting, I do not restrict myself to a complete severing of the web, and intend by this term to include what is commonly understood as perforating, punching, or scoring.

It will be obvious that the angular adjustment of the perforating roller 6 relatively to the web produces the same result as if the feeding rollers were provided with a similar adjustment to be operated while driving the perforating roller at a fixed speed, and the invention is applicable for either purpose. That is, it is possible by either or both of these mechanisms to vary the cut length of the pattern while the machine is running, without varying the length of the cutter itself. This is a very important and novel result accomplished by this machine, because it is found in practice that the printed length of the pattern varies. The problem which is solved by this invention is to cut a correspondingly variable length of pattern with a cutter of fixed length, without tearing the paper. Actual experience has shown that a slight difference between the velocity of the cutter and the velocity of the paper integrates sufficiently to maintain registry. Thus, with a cutter 18 inches long, I have been able to vary the length of the pattern cut as much as ¾ of an inch, without damaging the paper. This range of possible variation is ample to meet the usual conditions. The adjustments of the relation between the length of cut and the feed of the paper are also useful in enabling the machine to be accommodated to various sizes of cutting rolls and platens. It will be understood that the paper must be laterally adjusted when starting the machine to register with the pattern of the cutter, and also it must be a longitudinal registry, properly starting the cutting. Then, after the machine is running it may become necessary to still further adjust the relation between the cutters and the pattern on the paper by varying the normal length of cut while the machine is running. It is found simpler in practice to shift the cutting roller rather than to shift the feed rollers.

Various changes and modifications in the specific construction and arrangement of parts may be made without departing from the scope of the invention.

Having thus described my invention, I declare that what I claim as new and desire to secure by Letters Patent, is:—

1. In a machine for making cut-out decorative webs, rotary means for feeding a design bearing web, rotary means for cutting a design in said web, and variable speed means for driving said feeding means and said perforating means.

2. In a machine for making cut-out decorative webs, rotary means for feeding a design bearing web, rotary means for cutting said web, variable speed means for driving said feeding means and said cutting means, and means for relatively displacing the cutting means and the web to maintain registry of the cut pattern with the web pattern.

3. In a machine for cutting a design bearing web to permit separation thereof, means for positively feeding the web, a rotary cutting means for longitudinally cutting the web in predetermined relation to the design thereon, transversely adjustable guiding means to register the web longitudinally with said cutting means, and means for relatively longitudinally adjusting the cutting means and the web while the machine is running.

4. In a machine for cutting a design bearing web in correspondence with the design, rotary cutting and feeding means, means for driving said means separately at variable speeds, and independent means for varying the relative angular position of said feeding and cutting means.

5. The combination with rotary cutting means, and a movable coöperating platen, of positive feeding means independent thereof, means for driving the feeding means independently of the cutting means and platen, and means for varying the relative speeds of said feeding means and said cutting device.

6. The combination with rotary cutting means, and a rotary coöperating platen, of positive feeding means independent thereof, means for driving the feeding means independently of the cutting means and platen, means for varying the relative speeds of said feeding means and said cutting device, and means for varying the normal length of cut produced by said cutting means in a predetermined travel.

In testimony whereof I affix my signature, in presence of two witnesses.

ROBERT DIEHL.

Witnesses:
P. G. BRUMFIELD,
GEORGE ELDER.

Copies of this patent may be obtained for five cents each, by addressing the "Commissioner of Patents, Washington, D. C."